United States Patent Office 3,360,517
Patented Dec. 26, 1967

3,360,517
3-AMINO-6-SUBSTITUTED-PYRAZINOYL-GUANIDINES
Edward J. Cragoe, Jr., Lansdale, Pa., assignor to Merck & Co., Inc., Rahway, N.J., a corporation of New Jersey
No Drawing. Filed Mar. 16, 1966, Ser. No. 534,638
The portion of the term of the patent subsequent to Apr. 11, 1984, has been disclaimed
14 Claims. (Cl. 260—250)

This application is a continuation-in-part of my co-pending United States patent applications Ser. No. 356,040 filed Mar. 31, 1964 (now abandoned), and Ser. No. 313,315 filed Oct. 7, 1963, now Patent No. 3,313,813.

This invention is concerned with novel (3-amino-6-R-pyrazinoyl)guanidines as well as pharmaceutically acceptable salts thereof and with novel methods for their preparation.

The compounds of this invention can be represented by the structural formula

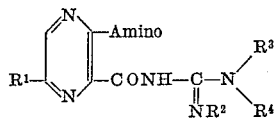

and pharmaceutically acceptable salts thereof, especially the hydrochloride and methane sulfonate salts and the like wherein
$R^1$ is
   (1) lower alkyl, either straight or branched chain lower alkyl or cyclic as cyclopropyl, cyclohexyl or other cycloalkyl groups,
   (2) lower alkoxy wherein the alkyl moiety can be of the type described above,
   (3) monocarbocyclic aryl-lower alkyl, advantageously phenyl-lower alkyl as benzyl, phenethyl, phenyl-propyl and the like or wherein the phenyl radical can be substituted, for example, with a lower alkyl, alkoxy and the like groups,
   (4) lower alkylthio or -sulfonyl, wherein the alkyl moiety can be straight or branched chain or cyclic, and which can be unsubstituted or substituted with, for example, a mononuclear aryl group, such as phenyl,
   (5) mononuclear aryl, especially phenyl which can be substituted with lower alkyl, alkoxy or halogen group(s),
   (6) amino or substituted amino, as a mono- or di-lower alkylamino, monocarbocyclic aryl-lower alkylamino, or anilino and the like, or the amino substituent can have the structure

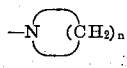

where $n$ is a numeral from 4 to 7, advantageously being a 1-pyrrolidinyl, piperidino, hexahydro-1-azepinyl or octahydro-1-azocinyl radical and the like;
$R^2$ is hydrogen and lower alkyl;
$R^3$ is
   (1) hydrogen,
   (2) lower alkyl, either saturated or unsaturated and substituted or unsubstituted, the substituent group(s) preferably being
      (a) hydroxyl,
      (b) aryl, either mono- or di-nuclear aryl, as phenyl or naphthyl, and either unsubstituted or containing one or more substituents, especially selected from
         halogen,
         lower alkyl,
         lower alkoxy, or any combination of these substituent groups,
      (c) mono- or di-lower alkylamino, wherein the alkyl groups may be linked to form a hetero structure with the amino-nitrogen to which they are attached such as to form an azacycloalkyl group,
      (d) heterocyclic, and especially the pyridyl group,
      (e) halogen,
   (3) aryl or substituted aryl, the substituent group(s) preferably being
      halogen, and
      lower alkyl,
   (4) heterocyclic, advantageously a pyridyl radical,
   (5) alkylideneamino, and
   (6) acyl;
$R^4$ is
   (1) hydrogen
   (2) lower alkyl, either saturated or unsaturated and substituted or unsubstituted as described above for $R^3$; or
$R^3$ and $R^4$ can be lower alkyl groups linked directly together or through a hetero atom, especially through oxygen or nitrogen to produce a 5 to 8 membered cyclic structure, thus forming with the nitrogen atom to which they are attached a
   1-pyrrolidinyl,
   piperidino,
   1-piperazinyl, especially a 4-lower alkyl-1-piperazinyl or morpholino, and the like radicals;
and when $R^2$ and $R^3$ (or $R^4$) each represents a lower alkyl, they can be linked together to form a cyclic structure with the nitrogen atoms to which they are attached, particularly to form a 2-(2-imidazolinyl)radical.

The 3-position amino group can be an unsubstituted amino as well as mono- or di-substituted amino groups, the substituent(s) advantageously being lower alkyl and lower alkanoyl and also where the substituents are linked to form a heterocyclic structure with the amino nitrogen to which they are attached.

The compounds of this invention are useful because they possess diuretic and natriuretic properties. As diuretic agents, they can be used for the treatment of edema, hypertension and other diseases known to be responsive to this therapy.

In some instances it may be desirable to make a salt of these compounds using a pharmaceutically acceptable acid, and these salts are to be considered as included in this invention and in the scope of the claims.

The products of this invention can be administered to man or animals in the form of pills, tablets, capsules, elixirs, injectable preparations and the like and can comprise one or more of the compounds of this invention as the only essential active ingredient of the pharmaceutical formulation or, as mentioned above, the novel compound(s) can be combined in pharmaceutical formulations with other diuretic agents or, indeed, other therapeutic agents.

The compounds of this invention are advantageously administered at a dosage range of from about 5 mg./day to about 1g./day or at a somewhat higher or lower dosage at the physician's discretion, preferably in subdivided amounts on a 2 to 4 time a day regimen.

One generally useful process for the preparation of the novel compounds of this invention can be represented as follows.

Method A

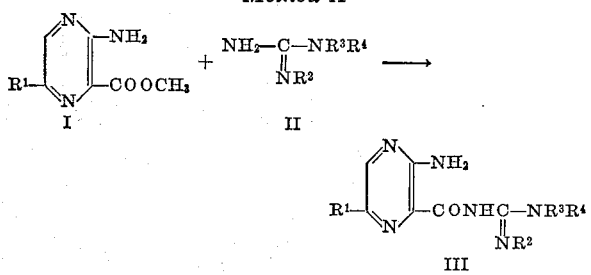

Method A synthesis involves the reaction of a pyrazinoic acid ester of the type illustrated by Compound I with a guanidine of the type illustrated by Compound II. The methyl ester is shown for illustrative purposes only since the ester may be that of certain other alcohols, especially lower aliphatic alcohols. It will be noted that this alkoxy (ester) radical does not appear in the desired end product.

Synthesis by Method A is preferably carried out under anhydrous conditions either with or without a solvent such as methanol, ethanol, isopropyl alcohol or other solvents. The reaction may be carried out at room temperature or by heating on a steam bath for 1 minute to 2 hours or longer. The desired product usually is recovered from the cooled reaction mixture by trituration with water. Purification frequently is carried out by converting the product to a salt which can be recrystallized or the base can be regenerated by addition of aqueous alkali.

Another method which is useful in preparing the compounds of this invention including having an acyl substituent attached to the 3-amino group, can be illustrated as follows:

Method B

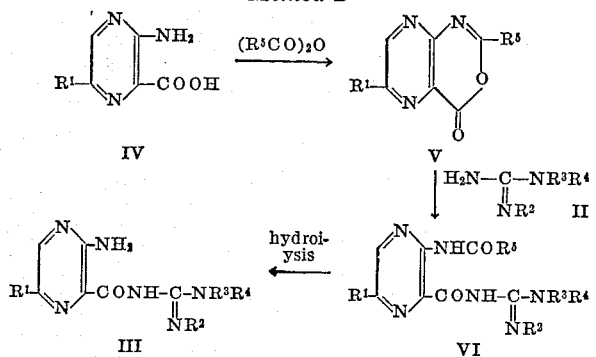

When Compound IV is heated with a lower alkanoic acid anhydride ($R^5CO$—$OCO$—$R^5$) a 2-alkyl-4H-pyrazino-[2,3-d][1,3]oxazin-4-one (Compound V) is obtained. To obtain the Compound V in which $R^5$ equals hydrogen, Compound IV is heated with a mixture of formic acid and acetic anhydride. Compound V then is dissolved in a solvent such as ethyl acetate, for example, and is heated in an atmosphere of nitrogen with the guanidine (Compound II) to produce Compound VI. Compound VI will be recognized as one of the compounds of the invention having an acyl radical attached to the amino group in the 3-position of the nucleus. This acyl group can be removed readily by hydrolysis to form Compound III.

It will be appreciated that when the 6-position $R^1$ group in Compound IV either is or contains a functional group that would react with the lower alkanoic acid anhydride, the corresponding acylated derivative of V and of VI would form. However, subsequent hydrolyses would regenerate the original or unacylated $R^1$ substituent.

The acid salts of the (3-amino-6-substituted-pyrazinoyl) guanidines can be prepared by any suitable known method. Particularly useful salts are the hydrohalide salts as hydrochloride, hydrobromide, hydriodide, the sulfate, phosphate and other inorganic acid salts as well as organic acid salts as the acetate, maleate, tartrate and the like salts.

Preparation of 3-amino-6-$R^1$-pyrazinoic acid esters

The intermediate 3-amino-6-$R^1$-pyrazinoic acid esters, in most instances, are novel compounds. The esters are prepared by a number of different methods which are illustrated below. Some of the esters can be prepared by any one of several of the methods described; with others certain methods are preferable and with a few esters one particular method is specific for their synthesis.

As the details concerning the actual reaction conditions are provided in the examples, the reaction scheme for each of the preferred procedures is provided without discussion.

Preparation via aminomalonamidamidine

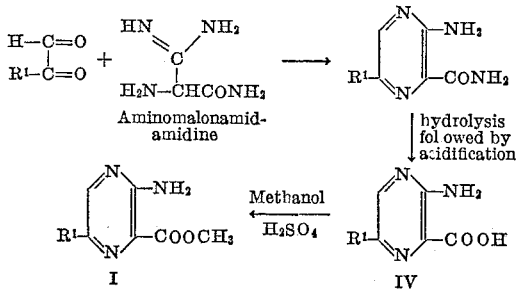

The above reaction is limited to products wherein $R^1$ is alkyl, cycloalkyl, cycloalkyl-alkyl, aryl and aralkyl.

Preparation via halogenation

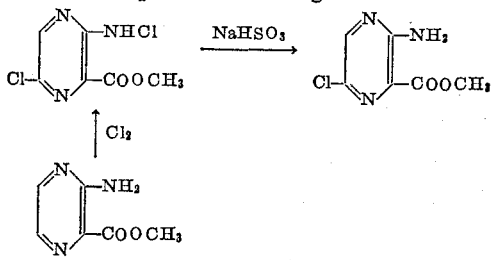

The intermediate 3-amino-6-$R^1$-pyrazinoic acids required in the synthesis of the 4H-pyrazino[2,3-d][1,3]-oxazin-4-ones (V) which are used in Method B are prepared as follows:

Special method for 6-$R^1$S and 6-$R^1SO_2$ compounds

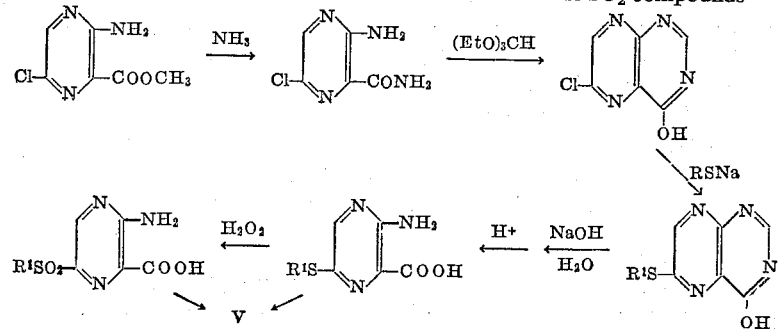

The above reaction is limited to products wherein $R^1$ is alkyl, aryl and aralkyl.

Special method for preparation
of certain other 6-substituted compounds

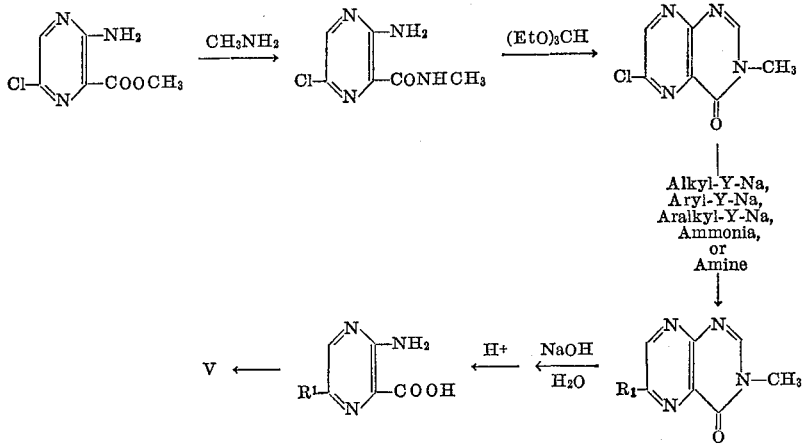

In the above reaction scheme Y represents O or S, and $R^1$ is limited to alkoxy, alkylthio, aryloxy, arylthio, aralkoxy, aralkylthio, amino or substituted amino of the type hereinbefore described.

While generally useful methods are illustrated above for the preparation of the starting materials used in Methods A and B above, other methods for making certain needed starting materials will be described in the following examples.

The following examples also are illustrative of the methods by which the products of this invention can be prepared and are not to be considered as limiting the invention to the particular procedural conditions employed or to the particular compounds prepared thereby.

*Example 1.—(3-amino-6-ethylpyrazinoyl)guanidine*

Step A: Preparation of 3-amino-6-ethylpyrazinamide.—Aminomalonamidamidine dihydrochloride (52.5 g., 0.28 mole) is added to an ice cold solution of ethylglyoxal (28.8 g., 0.335 mole) in water (450 ml.). Concentrated ammonium hydroxide solution (about 65 ml.) is added to make the solution basic. The solution is allowed to stand at room temperature 20 hours and the precipitated product that forms is collected by filtration and recrystallized from 2-propanol yielding 17.5 g. of 3-amino-6-ethylpyrazinamide, M.P. 160–167° C. An additional recrystallization from 2-propanol increases the melting point to 165.5–168.5° C.

Analysis calculated for $C_7H_{10}N_4O$: N, 33.72. Found: N, 33.83.

Step B: Preparation of 3-amino-6-ethylpyrazinoic acid.—A mixture of 3-amino-6-ethylpyrazinamide (24.4 g., 0.147 mole) and 10% sodium hydroxide solution (200 ml.) is stirred and heated on a steam bath for 30 minutes. When the resulting solution is chilled, the sodium salt of the product acid precipitates. The salt is collected, dissolved in hot water, and the solution acidified with hydrochloric acid to precipitate 22.8 g. of 3-amino-6-ethylpyrazinoic acid, M.P. 149–152° C. which is used directly in the next step without further purification.

Step C: Preparation of methyl 3-amino-6-ethylpyrazinoate.—A solution of 3-amino-6-ethylpyrazinoic acid (14 g., 0.084 mole) in a 33% solution of hydrogen chloride in methanol (160 ml.) is stirred 24 hours at room temperature. The solution is evaporated by dryness in vacuo. The residue is triturated with sodium bicrabonate solution and the insoluble product collected and recrystallized from 2-propanol to yield 4.3 g. of methyl 3-amino-6-ethylpyrazinoate, M.P. 85–87.5° C.

Analysis calculated for $C_8H_{11}N_3O_2$: C, 53.03; H, 6.12; N, 23.19. Found: C, 53.11; H, 6.16; N, 23.26.

Step D: Preparation of (3-amino-6-ethylpyrazinoyl)guanidine.—Guanidine hydrochloride (5.8 g., 0.06 mole) is added to a solution of sodium (1.1 g., 0.05 g. atom) in methanol (30 ml.). The mixture is concentrated in vacuo to a syrup, methyl 3-amino-6-ethylpyrazinoate (0.012 mole) is added, and the reaction mixture heated 20 minutes on the steam bath. Ice water is added, followed by 15 ml. of 5% hydrochloric acid. The solution is filtered, treated with 2 ml. of concentrated hydrochloric acid, and chilled to obtain a precipitate of the hydrochloric salt of the product. The salt is dissolved in water and the solution made basic to precipitate the basic product which is recrystallized by taking the product up in dilute hydrochloric acid and reprecipitating by addition of sodium hydroxide. There is thus obtained a 53% yield of (3-amino-6-ethylpyrazinoyl)-guanidine, M.P. 207–209° C. (dec.).

Analysis calculated for $C_8H_{12}N_6O$: C, 46.14; H, 5.81; N, 40.36. Found: C, 46.47; H, 5.69; N, 40.34.

*Example 2.—(3-amino-6-methylpyrazinoyl)guanidine*

Step A: Preparation of methyl 3-amino-6-methylpyrazinoate.—A mixture of 3-amino-6-methylpyrazinamide (31 g., 0.20 mole) and 10% sodium hydroxide solution (320 ml.) is stirred and heated on a steam bath for 30 minutes, whereupon a clear solution is obtained. The solution is chilled and the sodium salt of 3-amino-6-methylpyrazinoic acid which precipitates, is collected and air dried yielding 25 g. of the salt. A mixture of the sodium salt of 3-amino-6-methylpyrazinoic acid (97 g., 0.55 mole), dimethyl sulfate (77 g., 0.61 mole) and methanol (700 ml.) is stirred 19 hours at room temperature. A small amount of suspended solid is removed by filtration, and the filtrate evaporated to dryness in vacuo. The residue is stirred with a saturated sodium bicarbonate solution (200 ml.) and the insoluble product is collected, washed with water and dried, yielding 18 g. of methyl 3-amino-6-methylpyrazinoate, M.P. 138–140° C. which after recrystallization from benzene melts at 138.5–140.5° C.

Analysis calculated $C_7H_9N_3O_2$: C, 50.29, H, 5.43; N, 25.14. Found: C, 50.45; H, 5.49; N, 25.02.

Step B: Preparation of (3-amino-6-methylpyrazinoyl) guanidine.—By replacing the methyl 3-amino-6-ethylpyrazinoate employed in Example 1, step D, by an equimolecular quantity of methyl 3-amino-6-methylpyrazinoate and following substantially the same procedure there described except heating on the steam bath is continued for 10 minutes, there is obtained an 87% yield of (3-amino-6-methylpyrazinoyl)guanidine, M.P. 218–219° C. (dec.).

Analysis calculated for $C_7H_{10}N_6O$: C, 43.29; H, 5.19; N, 43.28. Found: C, 43.50; H, 5.07; N, 43.25.

*Example 3.—(3-amino-6-cyclohexylpyrazinoyl)guanidine*

*Step A: Preparation of 3-amino-6-cyclohexylpyrazinamide.*—This compound is prepared by essentially the same method described in Example 1, step A, except that an equimolecular quantity of cyclohexylglyoxal is substituted for the ethylglyoxal employed in Example 1, Step A.

*Step B: Preparation of 3-amino-6-cyclohexylpyrazinoic acid.*—This compound is prepared by essentially the same method described in Example 1, Step B, except that an equimolecular quantity of 3-amino-6-cyclohexylpyrazinamide is substituted for the 3-amino-6-ethylpyrazinamide employed in Example 1, Step B.

*Step C: Preparation of methyl 3-amino-6-cyclohexylpyrazinoate.*—This compound is prepared by essentially the same method described in Example 1, Step C, except that an equimolecular quantity of 3-amino-6-cyclohexylpyrazinoic acid is substituted for the 3-amino-6-ethylpyrazinoic acid employed in Example 1, Step C. The methyl 3-amino-6-cyclohexylpyrazinoate thus obtained melts at 126.5–128.0° C.

Analysis calculated for $C_{12}H_{17}N_3O_2$: C, 61.25; H, 7.28; N, 17.86. Found: C, 61.39; H, 7.12; N, 17.87.

*Step D: Preparation of (3-amino-6-cyclohexylpyrazinoyl)guanidine.*—By replacing the methyl 3-amino-6-ethylpyrazinoate employed in Example 1, Step D, by an equimolecular quantity of methyl 3-amino-6-cyclohexylpyrazinoate and following substantially the same procedure there described, there is obtained a 61% yield of (3-amino-6-cyclohexylpyrazinoyl)guanidine, M.P. 228–230° C. (dec.).

Analysis calculated for $C_{12}H_{18}N_6O$: C, 54.94; H, 6.92; N, 32.04. Found: C, 55.25; H, 6.83; N, 31.78.

*Example 4.—(3-amino-6-cyclopropylpyrazinoyl)guanidine*

*Step A: Preparation of 3-amino-6-cyclopropylpyrazinamide.*—This compound is prepared by essentially the same method described in Example 1, Step A, except that an equimolecular quantity of cyclopropylglyoxal is substituted for the ethylglyoxal used in Example 1, Step A. The product has a melting point of 185.5–187.5° C.

Analysis calculated for $C_8H_{10}N_4O$: C, 53.92; H, 5.66. Found: C, 53.83; H, 5.43.

*Step B: Preparation of 3-amino-6-cyclopropylpyrazinoic acid.*—This compound is prepared by essentially the same method described in Example 1, Step B, except that an equimolecular quantity of 3-amino-6-cyclopropylpyrazinamide is substituted for the 3-amino-6-ethylpyrazinamide employed in Example 1, Step B. The product has a melting point of 169–172° C. and is used directly without further purification in the next step.

*Step C: Preparation of methyl 3-amino-6-cyclopropylpyrazinoate.*—This compound is prepared by essentially the same method described in Example 1, Step C, except that an equimolecular quantity of 3-amino-6-cyclopropylpyrazinoic acid is substituted for the 3-amino-6-ethylpyrazinoic acid employed in Example 1, Step C. The product has a melting point of 112.5–114.5° C.

Analysis calculated for $C_9H_{11}N_3O_2$: C, 55.95; H, 5.74. Found: C, 55.61; H, 5.64.

*Step D: Preparation of (3-amino-6-cyclopropylpyrazinoyl)guanidine.*—By replacing the methyl 3-amino-6-ethylpyrazinoate employed in Example 1, Step D, by an equimolecular quantity of methyl 3-amino-6-cyclopropylpyrazinoate and following substantially the same procedure there described, there is obtained a 61% yield of (3 - amino - 6 - cyclopropylpyrazinoyl)guanidine, M.P. 196.5–199° C. (dec.).

Analysis calculated for $C_9H_{12}N_6O$: C, 49.08; H, 5.49; N, 38.16. Found: C, 49.35; H, 5.49; N, 37.94.

*Example 5.—(3-amino-6-phenylpyrazinoyl)guanidine*

*Step A: Preparation of methyl 3-amino-6-phenylpyrazinoate.*—3-amino-6-phenylpyrazinoic acid (30 g., 0.14 mole) is added to a solution of hydrogen chloride (480 g.) in methanol (1500 ml.), and the mixture is stirred for 42 hours at room temperature. The mixture then is evaporated in vacuo to about one-quarter volume and poured into 1 liter of water. The mixture is made basic by the addition of sodium bicarbonate, and the product collected and recrystallized from methanol to give 21 g. of methyl 3-amino-6-phenylpyrazinoate, M.P. 140–141° C.

Analysis calculated for $C_{12}H_{11}N_3O_2$: C, 62.93; H, 4.84; N, 18.32. Found: C, 62.72; H, 4.90; N, 18.27.

*Step B: Preparation of (3-amino-6-phenylpyrazinoyl)guanidine.*—By replacing the methyl 3-amino-6-ethylpyrazinoate employed in Example 1, Step D, by an equimolecular quantity of methyl 3-amino-6-phenylpyrazinoate and following substantially the same procedure there described, there is obtained a 34% yield of (3-amino-6-phenylpyrazinoyl)guanidine which after recrystallization from a mixture of 2-propanol and water melts at 194.5–195.5° C. (dec.).

Analysis calculated for $C_{12}H_{12}N_6O$: C, 56.24; H, 4.72; N, 32.80. Found: C, 56.63; H, 5.03; N, 32.99.

*Example 6.—(3-amino-6-phenethylpyrazinoyl)guanidine*

By replacing ethylglyoxal used in Step A of Example 1, by an equimolecular quantity of 2-oxo-4-phenylbutyraldehyde and using the other reactants and reaction conditions there described, there is obtained 3-amino-6-phenethylpyrazinamide. By employing this amide in place of the 3-amino-6-ethylpyrazinamide used in Step B of Example 1 and then following the procedures described in Steps B through D of Example 1, there are obtained successively 3 - amino - 6 - phenethylpyrazinoic acid, methyl 3-amino-6-phenethylpyrazinoate and then (3-amino-6-phenethylpyrazinoyl)guanidine.

*Example 7.—[3-amino-6-(p-chlorophenyl)pyrazinoyl]guanidine*

*Step A: Preparation of 3-amino-6-p-chlorophenylpyrazinoic acid.*—p-Chlorophenylglyoxal monohydrate (34.5 g., 0.184 mole) is added to a solution of aminomalonamidamidine dihydrochloride (41.1 g., 0.22 mole) in water (1400 ml.). The mixture is made basic by the addition of concentrated ammonium hydroxide (40 ml.) and stirred 20 hours at room temperature. The precipitate, consisting of 3-amino-6-p-chlorophenylpyrazinamide, is collected, washed with hot ethanol, and hydrolyzed by being heated for 5.5 hours on the steam bath with 5% sodium hydroxide solution (1200 ml.). The resulting solution is cooled and the sodium salt of 3-amino-6-p-chlorophenylpyrazinoic acid precipitates. The salt is collected and dissolved in boiling water, the solution is acidified with concentrated hydrochloric acid, and the precipitated acid is recrystallized from acetic acid to yield 10.5 g. of 3-amino-6-p-chlorophenylpyrazinoic acid, M.P. 207–213° C. A further recrystallization from acetic acid raises the melting point to 213–215° C.

Analysis calculated for $C_{11}H_8ClN_3O_2$: C, 52.92; H, 3.23; N, 16.83. Found: C, 52.69; H, 3.19; N, 16.89.

*Step B: Preparation of methyl 3 - amino - 6 - (p - chlorophenyl)pyrazinoate.*—This compound is prepared by essentially the same method described in Example 5, Step A, except that an equimolecular quantity of 3-amino-6-p-chlorophenylpyrazinoic acid is substituted for the 3-amino-6-phenylpyrazinoic acid of Example 5, Step A. The product has a melting point of 181.5–183.5° C.

Analysis calculated for $C_{12}H_{10}ClN_3O_2$: C, 54.66; H, 3.82; N, 15.94. Found: C, 54.37; H, 3.69; N, 15.92.

*Step C: Preparation of [3 - amino - 6 - (p- - chlorophenyl) pyrazinoyl]guanidine.*—By replacing the methyl 3-amino-6-ethylpyrazinoate employed in Example 1, Step D, by an equimolecular quantity of methyl 3-amino-6-(p-chlorophenyl)pyrazinoate, and following substantially the same procedure there described except heating on the steam bath is continued for 10 minutes there is obtained a 70% yield of [3-amino-6-(p-chlorophenyl)pyrazinoyl] guanidine which after recrystallization from a mixture of 2-propanol and water melts at 282–285° C. (dec.).

Analysis calculated for $C_{12}H_{11}ClN_6O$: C, 44.05; H, 3.70; N, 25.69. Found: C, 43.74; H, 3.79; N, 25.31.

*Example 8.—(3-Isopropylideneamino-6-anilino-pyrazinoyl)guanidine*

*Step A: Preparation of methyl 3 - amino - 6 - chloropyrazinoate.*—A 5-liter, 3-necked flask equipped with a mechanical stirrer, thermometer and gas inlet tube is charged with a warm (about 38° C.) mixture of water (3180 ml.) and glacial acetic acid (750 ml.) and methyl 3-aminopyrazinoate (90 g., 0.588 mole) then is added. The stirrer is started and the mixture heated to 41° C. which causes nearly all the ester to dissolve. The solution then is cooled to just below 40° C. via an ice bath. With vigorous stirring, chlorine (about 140 g.) is passed through the solution over a period of 25 minutes. A precipitate begins to form after five minutes and becomes voluminous by the end of the reaction. The temperature drops to 20–25° C. during the reaction. The nearly white precipitate, which is methyl 3-chloroamino-6-chloropyrazinoate, is removed by filtration and washed with a small amount of ice water. A small amount of this material when recrystallized from warm acetic acid, melts at 142° C. (dec.).

The moist methyl 3-chloroamino-6-chloropyrazinoate and a solution of sodium bisulfite (150 g.) in water (900 ml.) are placed in a 4-liter beaker and stirred mechanically for one-half hour, maintaining a temperature of 25° C. by addition of ice. The yellow product is removed by filtration, suspended in 150 ml. of ice water and filtered. This process is repeated twice with 150 ml. portions of ice water and once with a 50 ml. portion of cold isopropyl alcohol. After drying in air there is obtained 60 g. (55% yield) of methyl 3-amino-6-chloropyrazinoate, M.P. 159–161° C.

*Step B: Preparation of methyl 3-isopropylideneamino-6-anilinopyrazinoate.*—A solution of methyl 3-amino-6-chloropyrazinoate (18.8 g., 0.1 mole), aniline (15 g., 0.16 mole) and concentrated hydrochloric acid (2.5 ml.) in acetone (150 ml.) is refluxed 16 hours and then chilled. The crystalline product which separates is recrystallized from aqueous 2-propanol to yield 7.4 g. of methyl 3-isopropylideneamino-6-anilinopyrazinoate M.P. 193.5–197.5° C. After further recrystallization from 2-propanol, the product melts at 195.5–197.5° C.

*Step C: Preparation of (3 - isopropylideneamino - 6 - anilinopyrazinoyl)guanidine.*—By replacing the methyl 3-amino-6-ethylpyrazinoate employed in Example 1, Step D, by an equimolecular quantity of methyl 3-isopropylideneamino-6-anilinopyrazinoate and following substantially the same procedure there described there is obtained a 35% yield of (3-isopropylideneamino-6-anilinopyrazinoyl)guanidine which after recrystallization from water melts at 214–216° C. (dec.).

Analysis calculated for $C_{15}H_{17}N_7O$: C, 57.86; H, 5.51; N, 31.50. Found: C, 57.95; H, 5.54; N, 31.45.

*Example 9.—(3-amino-6-benzylthiopyrazinoyl) guanidine*

*Step A: Preparation of 3 - amino - 6 - chloropyrazinamide.*—Methyl 3-amino-6-chloropyrazinoate (300 g., 1.6 mole) is added to 2 liters of concentrated ammonium hydroxide solution and the mixture stirred 16 hours at room temperature. The solid product formed is collected by filtration and dried yielding 260 g., of 3-amino-6-chloropyrazinamide, M.P. 227–230° C.

*Step B: Preparation of 6-chloro-4(3H)-pteridinone.*—A mixture of 3-amino-6-chloropyrazinamide (33 g., 0.19 mole), acetic anhydride (200 ml.) and ethyl orthoformate (200 ml.) is refluxed 1.5 hours. The mixture is cooled and the product which precipitates is collected and recrystallized from aqueous 2-propanol; yield 20 g. of 6-chloro-4 (3H)-pteridinone, M.P. 268–270° C. (dec.).

Analysis calculated for $C_6H_3ClN_4O$: C, 39.47; H, 1.65; N, 30.69. Found: C, 39.61; H, 1.87; N, 31.23.

*Step C: Preparation of 6 - benzylthio - 4(3H) - pteridinone.*—A solution of 6-chloro-4(3H)-pteridinone (5.5 g., 0.03 mole) and benzyl mercaptan (4.4 g., 0.035 mole) in 4% sodium hydroxide solution (100 ml.) is heated 30 minutes on the steam bath. The solution is cooled and 40% sodium hydroxide solution (20 ml.) is added to precipitate the sodium salt of the product. The salt is collected, dissolved in 250 ml. of hot water, and the solution is acidified to precipitate the product which is recrystallized from aqueous 2-propanol to yield 5.5 g. of 6-benzylthio-4(3H)-pteridinone, M.P. 233–235° C.

Analysis calculated for $C_{13}H_{10}N_4OS$: C, 57.76; H, 3.73; N, 20.73. Found: C. 57.79; H. 3.95; N. 20.59.

*Step D: Preparation of 3-amino-6-benzylthiopyrazinoic acid.*—A solution of 6-benzylthio - 4(3H) - pteridinone (42.2 g., 0.156 mole) in 5% sodium hydroxide solution (600 ml.) is heated 8 hours on the steam bath. The solution is chilled to precipitate the sodium salt of the product. The salt is dissolved in hot water and the solution acidified to precipitate 23 g. of 3-amino-6-benzylthiopyrazinoic acid, M.P. 127–139° C. After an additional recrystallization from ethyl acetate the product melts at 138–139° C.

Analysis calculated for $C_{12}H_{11}N_3O_2S$: C, 55.16; H, 4.24; N, 16.08. Found: C, 54.75; H, 4.10; N, 15.96.

*Step E: Preparation of 2-methyl - 6 - benzylthio-4-H-pyrazino-[2,3-d][1,3]oxazin-4-one.*—A solution of 3-amino-6-benzylthiopyrazinoic acid (8.5 g., 0.0325 mole) in acetic anhydride (50 ml.) is heated 5 hours on the steam bath. Volatile materials are distilled in vacuo and the residue is recrystallized from benzene to give 6.6 g. of 2-methyl-6-benzylthio-4-H-pyrazino [2,3 - d]-[1,3]-oxazin-4-one, M.P. 116.5–118.5° C.

Analysis calculated for $C_{14}H_{11}N_3O_2S$: C, 58.93; H, 3.89; N, 14.73. Found: C, 58.99; H, 3.93; N, 14.68.

*Step F: Preparation of (3-amino - 6 - benzylthiopyrazinoyl)-guanidine.*—Guanidine hydrochloride (5.0 g., 0.052 mole) is added to a solution of sodium (1.0 g., 0.043 g. atom) in 2-propanol (30 ml.). 2-methyl-6-benzylthio-4-H-pyrazino - [2,3-d][1,3]oxazin-4-one (3.4 g., 0.012 mole) is added and the mixture allowed to stand 1 hour at room temperature. The mixture then is poured into water (100 ml.) and the mixture acidified with hydrochloric acid to dissolve and deacetylate the gummy product which precipitates. The solution is made basic to precipitate the product which is recrystallized from aqueous 2-propanol to yield 1.1 g. of 3-amino-6-benzylthiopyrazinoyl)guanidine, M.P. 171–173° C. (dec.).

Analysis calculated for $C_{13}H_{14}N_6OS$: C, 51.64; H, 4.67; N, 27.80. Found: C, 51.85; H, 4.82; N. 27.62.

*Example 10.—(3-acetamido-6-methylthiopyrazinoyl) guanidine*

*Step A: Preparation of 6 - methylthio - 4(3H)-pteridinone.*—Methyl mercaptan (4.8 g., 0.1 mole) is dissolved in a 10% sodium hydroxide solution (60 ml.)., and added to a solution of 6-chloro-4(3H)-pteridinone from Example 9, Step B (9.1 g., 0.05 mole), in a 4% sodium hydroxide solution (100 ml.). The resulting solution is heated 20 minutes on the steam bath, and then chilled to precipitate the sodium salt of the product. The salt is collected, dissolved in hot water and the solution acidified to precipitate the product which is recrystallized from aqueous 2-propanol to yield 3.5 g. of 6-methylthio-4(3H)-pteridinone, M.P. 289.5–291.5° C.

Step B: 3-amino-6-methylthiopyrazinoic acid.—A solution of 6-methylthio-4(3H)-pteridinone (25.5 g., 0.13 mole) in 5% sodium hydroxide solution (250 ml.) is heated 13 hours on the steam bath, and then chilled to precipitate the sodium salt of the product. The salt is collected, dissolved in hot water and the solution acidified to precipitate the product which is crystallized from ethyl acetate to yield 7.1 g. of 3-amino-6-methylthiopyrazinoic acid, M.P. 182–184° C. (dec.).

Analysis calculated for $C_6H_7N_3O_2S$: C, 38.91; H, 3.81. Found: C, 39.58; H, 3.98.

Step C: Preparation of 2-methyl-6-methylthio-4-H-pyrazino-[2,3-d][1,3]oxazin-4-one.—A solution of 3-amino-6-methylthiopyrazinoic acid (3.0 g., 0.016 mole) in acetic anhydride (15 ml.) is heated 2 hours on the steam bath, and then cooled. The product which separates is recrystallized from benzene to yield 2.5 g. of 2-methyl-6-methylthio-4-H-pyrazino[2,3-d][1,3]oxazin-4-one, M.P. 189–191° C.

Analysis calculated for $C_8H_7N_3O_2S$: C, 45.92; H, 3.37; N, 20.08. Found: C, 46.11; H, 3.42; N, 20.04.

Step D: Preparation of (3-acetamido-6-methylthiopyrazinoyl)guanidine.—Guanidine hydrochloride (5.0 g., 0.052 mole) is added to a solution of 1.0 g. (0.043 g. atom) of sodium in 30 ml. of 2-propanol. 2-methyl-6-methylthio-4-H-pyrazino-[2,3-d][1,3]oxazin-4-one (2.1 g., 0.01 mole) is added and the mixture stirred 1.5 hours at room temperature. The mixture is then poured into 100 ml. of water and the product that precipitates is removed by filtration. The product is dissolved in dilute hydrochloric acid and then reprecipitated by addition of dilute sodium hydroxide yielding 68% of (3-acetamido-6-methylthiopyrazinoyl)guanidine, M.P. 220–222° C.

Analysis calculated for $C_9H_{12}N_6O_2S$: C, 40.29; H, 4.51; N, 31.33. Found: C, 39.90; H, 4.39; N, 31.39.

Example 11.—(3-amino-6-methylthiopyrazinoyl)guanidine (3-acetamido-6-methylthiopyrazinoyl)guanidine, from Example 10, is added to water and the mixture acidified with hydrochloric acid to dissolve and then deacetylate the product. Upon making the solution basic with dilute sodium hydroxide, the product precipitates and is collected by filtration giving an 86% yield of (3-amino-6-methylthiopyrazinoyl)guanidine, M.P. 203–205° C.

Analysis calculated for $C_7H_{10}N_3OS$: C, 37.16; H, 4.45; N, 37.15. Found: C, 37.43; H, 4.51; N, 37.06.

Example 12.—(3-amino-6-methylsulfonylpyrazinoyl)guanidine

Step A: Preparation of 3-amino-6-methylsulfonylpyrazinoic acid.—A solution of potassium permanganate (1.05 g., 0.067 mole) in water (35 ml.) is added to a solution of 3-amino-6-methylthiopyrazinoic acid, from Example 10, Step B (0.92 g., 0.005 mole), in a 2.5% sodium hydroxide solution (15 ml.). Manganese dioxide is filtered off and the filtrate acidified to precipitate the product which is recrystallized from 2-propanol to yield 0.5 g. of 3-amino-6-methylsulfonylpyrazinoic acid, M.P. 239–242° C. (dec.).

Analysis calculated for $C_6H_7N_3O_4S$: C, 33.18; H, 3.25; N, 19.35. Found: C, 33.81; H, 3.35; N, 18.88.

Step B: Preparation of 2-methyl-6-methylsulfonyl-4H-pyrazino[2,3-d][1,3]oxazin-4-one.—A solution of 3-amino-6-methylsulfonylpyrazinoic acid (2.2 g., 0.01 mole) in acetic anhydride (25 ml.) is heated 5 hours on the steam bath, cooled and the precipitated product recrystallized from acetone to obtain 0.8 g. of 2-methyl-6-methylsulfonyl-4H-pyrazino[2,3-d][1,3]oxazin-4-one, M.P. 214–216° C.

Analysis calculated for $C_8H_7N_3O_4S$: C, 39.83; H, 2.93; N, 17.42. Found: C, 40.23; H, 2.92; N, 17.27.

Step C: Preparation of (3-amino-6-methylsulfonylpyrazinoyl)guanidine.—This product is prepared by essentially the same procedure described in Example 9, Step F, with the exception that an equimolecular quantity of 2-methyl-6-methylsulfonyl-4H-pyrazino[2,3-d][1,3]oxazin-4-one is employed in place of the oxazine used in Step F of Example 9. There is thus obtained a 27% yield of (3-amino-6-methylsulfonylpyrazinoyl)guanidine, which, after recrystallization from a mixture of 2-propanol and water melts at 224–226° C. (dec.).

Analysis calculated for $C_7H_{10}N_6O_3S$: C, 32.55; H, 3.90; N, 32.54. Found: C, 32.82; H, 3.70; N, 32.19.

Example 13.—(3-amino-6-benzylsulfonylpyrazinoyl)guanidine

By replacing the 3-amino-6-methylthiopyrazinoic acid used in Step A of Example 12 by an equimolecular quantity of 3-amino-6-benzylthiopyrazinoic acid (from Example 9, Step D) and then following substantially the same procedures described in Steps A through C of Example 12, there is obtained successively: 3-amino-6-benzylsulfonylpyrazinoic acid, 2-methyl-6-benzylsulfonyl-4H-pyrazino[2,3-d][1,3]oxazin-4-one and then (3-amino-6-benzylsulfonylpyrazinoyl)guanidine.

Example 14.—(3-amino-6-methoxypyrazinoyl)guanidine

Step A: Preparation of 3-methyl-6-methoxy-4(3H)-pteridinone.—Sodium (1.2 g., 0.052 g. atom) is dissolved in methanol (100 ml.), 3-methyl-6-chloro-4(3H)-pteridinone (the preparation of which will be described in Example 15, Steps A and B) (0.02 mole) is added and the solution is refluxed for four hours. After cooling, water (100 ml.) is added and the solution then is acidified with hydrochloric acid. The solid that separates is removed by filtration and recrystallized from ethanol to give a 98% yield of product, M.P. 232–234° C.

Analysis calculated for $C_8H_8N_4O_2$: C, 50.00; H, 4.20; N, 29.16. Found: C, 50.53; H, 4.47; N, 29.04.

Step B: Preparation of 2-methyl-6-methoxy-4H-pyrazino[2,3-d][1,3]oxazin-4-one.—By replacing the 6-methylthio-4(3H)-pteridinone employed in Step B of Example 10 by an equimolecular quantity of 3-methyl-6-methoxy-4(3H)-pteridinone and reacting it with sodium hydroxide by substantially the same procedure there described, the sodium salt of 3-amino-6-methoxypyrazinoic acid is obtained. This product then is substituted, in an equimolecular quantity, for the 3-amino-6-methylthiopyrazinoic acid used in Step C of Example 10, and following essentially the same procedure there is obtained a 52% yield of 2-methyl-6-methoxy-4H-pyrazino[2,3-d][1,3]oxazin-4-one which, after recrystallization from benzene melts at 190–192° C.

Analysis calculated for $C_8H_7N_3O_3$: C, 49.74; H, 3.65; N, 21.75. Found: C, 49.79; H, 3.52; N, 21.81.

Step C: Preparation of 3-acetamido-6-methoxypyrazinoylguanidine nitrate.—Guanidine hydrochloride (5.0 g., 0.052 mole) is added to a solution of sodium (1.0 g., 0.043 g. atom) in methanol (50 ml.) and the mixture is heated at reflux for 30 minutes. To this solution of guanidine is added 2-methyl-6-methoxy-4H-pyrazino[2,3-d][1,3]oxazin-4-one (1.9 g., 0.01 mole) and the reaction mixture is stirred at room temperature for two hours. Then water (100 ml.) is added, the reaction is made slightly acidic by the addition of acetic acid and the mixture filtered. The addition of 6 N nitric acid (5 ml.) causes the product to separate yielding 2.9 g. (92%) of 3-acetamido-6-methoxypyrazinoylguanidine nitrate, M.P. 225–229° C. (dec.). The product is purified by recrystallization from water.

Analysis calculated for $C_9H_{13}N_7O_6$: C, 32.29; H, 4.16; N, 31.10. Found: C, 34.68; H, 4.30; N, 31.10.

*Step D: Preparation of 3-amino-6-methoxypyrazinoylguanidine.*—A solution of 3-acetamido-6-methoxypyrazinoylguanidine nitrate (1.5 g., 0.005 mole) in 10% hydrochloric acid (15 ml.) is heated on the steam bath for 15 minutes, then cooled and carefully neutralized with dilute sodium hydroxide which causes 3-amino-6-methoxypyrazinoylguanidine to separate.

*Example 15.—(3-amino-6-dimethylaminopyrazinoyl) guanidine*

*Step A: Preparation of N-methyl-3-amino-6-chloropyrazinamide.*—Methyl 3-amino-6-chloropyrazinoate (20 g., 0.107 mole) is suspended in 40% aqueous methylamine (200 ml.) and the mixture stirred vigorously for 20 hours at room temperature. The reaction mixture is filtered and the solid washed with water and dried yielding 17.5 g. (87%) of N-methyl-3-amino-6-chloropyrazinamide, which after recrystallization from ethanol melts at 152.5–154.5° C.

Analysis calculated for $C_6H_7N_4OCl$: C, 38.62; H, 3.78; N, 30.03. Found: C, 38.62; H, 3.82; N, 29.71.

*Step B: Preparation of 3-methyl-6-chloro-4(3H)-pteridinone.*—To a mixture of triethyl orthoformate (20 ml.) and acetic anhydride (20 ml.) is added N-methyl-3-amino-6-chloropyrazinamide (3 g., 0.016 mole). The resulting solution is refluxed for two hours, the reaction mixture then is cooled, and the product that separates is removed by filtration, washed with ethyl acetate and dried yielding 2.6 g. (82%) of 3-methyl-6-chloro-4(3H)-pteridinone which after recrystallization from methanol melts at 217.5–219.5° C.

Analysis calculated for $C_7H_5N_4OCl$: C, 42.76; H, 2.56; N, 28.50. Found: C, 42.85; H, 2.79; N, 28.17.

*Step C: Preparation of 3-methyl-6-dimethylamino-4(3H)pteridinone.*—To a solution of 25% aqueous dimethylamine (5.0 ml.) in 2-methoxyethanol (40 ml.) is added 3-methyl-6-chloro-4(3H)pteridinone (4.0 g., 0.0205 mole) and the resulting solution is heated for 2.5 hours on the steam bath. The reaction mixture then is cooled in an ice bath whereupon a solid separates. This product is separated by filtration, washed with cold methanol and dried yielding 3.0 g. (72%) of 3-methyl-6-dimethylamino 4(3H)pteridinone which after recrystallization from methanol melts at 256–258° C.

Analysis calculated for $C_9H_{11}N_5O$: C, 52.67; H, 5.40; N, 34.13. Found: C, 52.99; H, 5.39; N, 34.19.

*Step D: Preparation of 3-amino-6-dimethylaminopyrazinoic acid.*—Sodium hydroxide (15 ml., 10%) and 3-methyl-6-dimethylamino-4(3H)pteridinone (1.0 g., 0.0049 mole) are mixed and then heated, with stirring, for 2.5 hours on the steam bath. The reaction is cooled to room temperature and then carefully neutralized with formic acid whereupon the product separates, recovered by filtration and air dried yielding 0.7 g. (79%) of 3-amino-6-dimethylaminopyrazinoic acid which after recrystallization from methanol melts at 164.5–165.5° C. (dec.).

Analysis calculated for $C_7H_{10}N_4O_2$: C, 46.15; H, 5.53; N, 30.76. Found: C, 46.32; H, 5.71; N, 30.68.

*Step E: Preparation of 2-methyl-6-dimethylamino-4H-pyrazino-[2,3-d][1,3]oxazin-4-one.*—A mixture of 3-amino-6-dimethylaminopyrazinoic acid (2.0 g., 0.011 mole) and acetic anhydride (25 ml.) is stirred and heated for 2.5 hours on the steam bath. The resulting solution is chilled in an ice bath whereupon a solid separates. This product is separated by filtration, washed with cold ether and dried yielding 1.5 g. (66%) of 2-methyl-6-dimethylamino-4H-pyrazino[2,3-d][1,3]oxazin-4-one, M.P. 212° C. (dec.). The melting point remained unchanged after recrystallization of the product from benzene.

Analysis calculated for $C_9H_{10}N_4O_2$: C, 52.42; H, 4.89; N, 27.17. Found: C, 52.89; H, 5.12; N, 27.04.

*Step F: Preparation of (3-acetamido-6-dimethylaminopyrazinoyl) guanidine nitrate.*—Sodium metal (0.5 g., 0.0217 mole) is dissolved in methanol (30 ml.) and guanidine hydrochloride (2.0 g., 0.021 mole) is added to the resulting solution. To this solution is added 6-dimethylamino-2-methyl-4H-pyrazino[2,3-d][1,3]-oxazin-4-one (10 g., 0.0048 mole) and the reaction mixture is stirred at room temperature for 3 hours. The solvent is removed by evaporation in vacuo after which water (50 ml.) is added. A yellow solid separates which is separated by filtration. The moist solid is suspended in water and dissolved by the addition of several drops of acetic acid. The clear solution obtained is filtered, cooled in an ice bath and then several drops of nitric acid are added. After a short time the red nitrate salt crystallizes. This material is separated by filtration and dried yielding 0.7 g. (44%), of (3-acetamido-6-dimethylaminopyrazinoyl) guanidine nitrate, M.P. 236.5° C. (dec.). Recrystallization from water did not change the melting point.

Analysis calculated for $C_{10}H_{16}N_6O_5$: C, 36.59; H, 4.91; N, 34.13. Found: C, 36.53; H, 5.02; N, 34.27.

*Step G: Preparation of (3-amino-6-dimethylaminopyrazinoyl)guanidine.*—A solution of (3-acetamido-6-dimethylaminopyrazinoyl)guanidine nitrate (0.5 g., 0.0015 mole) in 10% hydrochloric acid (10 ml.) is heated on the steam bath for 10 minutes. The solution then is cooled and carefully neutralized with sodium hydroxide. The orange solid that separates is collected on a funnel, washed with cold water, then dried yielding 0.25 g. (73%) of (3-amino-6-dimethylaminopyrazinoyl)guanidine M.P. 196.5° C. (dec.).

Analysis calculated for $C_8H_{13}N_7O$: C, 43.04; H, 5.87; N, 43.92. Found: C, 42.80; H, 6.00; N, 43.94.

*Example 16.—(3-amino-6-isopropylaminopyrazinoyl) guanidine*

By replacing the dimethylamine used in Example 15, Step C, by 5 ml. of a 25% solution of isopropylamine and then using the same reactants and reaction conditions employed in Step C of Example 15 there is obtained 3-methyl-6-isopropylamino-4(3H)pteridinone which is recovered by evaporation of the solvent by reduced pressure distillation. The pteridinone thus obtained then is used in place of the 3-methyl-6-dimethylamino-4(3H) pteridinone of Example 15, Step D, and by following the procedures described in Steps D through G of Example 15 there is obtained successively 3-amino-6-isopropylaminopyrazinoic acid (as the sodium salt), 2-methyl-6-isopropylamino-4H-pyrazino[2,3-d][1,3]oxazin-4-one, M.P. 212–214° C., (3-acetamido-6-isopropylaminopyrazinoyl) guanidine nitrate, M.P. 203–205° C. (dec.) and then (3-amino-6-isopropylaminopyrazinoyl) guanidine.

*Example 17.—(3-amino-6-benzylaminopyrazinoyl) guanidine*

By replacing the dimethylamine used in Example 15, Step C, by 5 ml. of a 25% solution of benzylamine and then using the same reactants and reaction conditions employed in Step C of Example 15 there is obtained 3-methyl-6-benzylamino-4(3H)pteridinone, M.P. 212–214° C. The pteridinone thus obtained then is used in place of the 3-methyl-6-dimethylamino-4(3H)pteridinone of Example 15, Step D, and by following the procedures described in Steps D through G of Example 15 there is obtained successively 3-amino-6-benzylaminopyrazinoic acid, M.P. 130–132° C. (dec.), 2-methyl-6-benzylamino-4H-pyrazino[2,3-d][1,3]oxazin-4-one, M.P. 168–170° C., (3-acetamido-6-benzylaminopyrazinoyl)guanidine nitrate, M.P. 225–228° C. (dec.) and then (3-amino-6-benzylaminopyrazinoyl) guanidine.

*Example 18.—(3-amino-6-piperidinopyrazinoyl) guanidine*

By replacing the dimethylamine used in Example 15, Step C, by 5 ml. of a 25% solution of piperidine and then using the same reactants and reaction conditions employed in Step C of Example 15 there is obtained 3-methyl-6-piperidino-4(3H)pteridinone, M.P. 207–209° C. The pteridinone thus obtained then is used in place of the 3-methyl-6-dimethylamino-4(3H)pteridinone of Example 15, Step D, and by following the procedures described in Steps D through G of Example 15 there is obtained successively 3-amino-6-piperidinopyrazinoic acid (as the sodium salt), 2-methyl-6-piperidino-4H-pyrazino-[2,3-d][1,3]oxazin-4-one, M.P. 172–174° C., (3-acetamido-6-piperidinopyrazinoyl)guanidine nitrate, M.P. 228° C. (dec.) and then (3-amino-6-piperidinopyrazinoyl)guanidine.

*Example 19.—(3-amino-6-methoxyaminopyrazinoyl) guanidine*

By replacing the dimethylamine used in Example 15, Step C, by 5 ml. of a 25% solution of methoxylamine and then using the same reactants and reaction conditions employed in Step C of Example 15 there is obtained 3-methyl-6-methoxyamino-4(3H)pteridinone, M.P. 232–234° C. The pteridinone thus obtained then is used in place of the 3-methyl-6-dimethylamino-4(3H)pteridinone of Example 15, Step D, and by following the procedures described in Steps D through G of Example 15 there is obtained successively 3-amino-6-methoxyaminopyrazinoic acid (as sodium salt), 2-methyl-6-methoxyamino-4H-pyrazino[2,3-d][1,3]oxazin-4-one, M.P. 190–192° C. (3-acetamido-6--methoxyaminopyrazinoyl)guanidine nitrate, M.P. 225° C. (dec.) and then (3-amino-6-methoxyaminopyrazinoyl)guanidine.

*Example 20.—(3,6-diaminopyrazinoyl)guanidine*

This product is prepared by substantially the same procedures described in Example 15 except that aqueous ammonia is substituted for the dimethylamine employed in Step C, and the reaction of ammonia and the pteridinone is carried out in a sealed vessel.

*Example 21.—(3-amino-6-methylaminopyrazinoyl) guanidine*

This product can also be prepared by substantially the same method described above except in Step C of Example 15 aqueous methylamine will be used and the reaction of methylamine and the pteridinone will be carried out in a sealed vessel.

*Example 22.—1-(3-amino-6-methylpyrazinoyl)-3,3-dimethylguanidine*

A 300 ml. round-bottomed, one-necked flask fitted with a water-cooled condenser, calcium chloride drying tube and a magnetic stirrer is charged with anhydrous methanol (200 ml.) and metallic sodium (2.3 g., 0.10 g. atom). When the reaction is completed, the solution is treated with 1,1-dimethylguanidine sulfate (15 g., 0.055 mole) and heated at reflux for one hour. The solution is cooled, filtered to remove sodium sulfate, and the filtrate reduced by vacuum distillation to a volume of 30 ml. and added to methyl 3-amino-6-methylpyrazinoate (0.05 mole) from Example 2. The reaction mixture is heated 30 minutes on a steam bath and kept one hour at room temperature. Subsequent treatment with 200 ml. of water gives 1-(3-amino-6-methylpyrazinoyl)-3,3-dimethylguanidine.

*Example 23.—1-(3-amino-6-methylpyrazinoyl)-3,3-tetramethyleneguanidine*

By replacing the 1,1-dimethylguanidine sulfate employed in Example 22 by an equimolecular quantity of 1-amidinopyrrolidine nitrate and following substantially the same procedure described in Example 22 there is obtained 1-(3-amino-6-methylpyrazinoyl)-3,3-tetramethyleneguanidine.

*Example 24.—1-(3-amino-6-methylpyrazinoyl)-2,3-dimethylguanidine*

By replacing the 1,1-dimethylguanidine sulfate employed in Example 22 by an equimolar quantity of 1,2-dimethylguanidine hydriodide and following substantially the same procedure described in Example 22 there is obtained 1-(3-amino-6-methylpyrazinoyl)-2,3-dimethylguanidine.

*Example 25.—1-(3-amino-6-methylpyrazinoyl)-3-(2-hydroxyethyl)guanidine hydrochloride*

Step A: Preparation of (2-hydroxyethyl)guanidine sulfate.—A solution of 2-methyl-2-pseudothiuronium sulfate (13.9 g., 0.05 mole) an of ethanolamine (9.2 g., 0.15 mole) in water (40 ml.) is heated 20 minutes on the steam bath. The solution is evaporated to dryness in vacuo and the syrupy residue stirred with ethanol to give a crystalline product. After recrystallization from aqueous ethanol there is obtained 12.5 g. of (2-hydroxyethyl)guanidine sulfate, M.P. 127.5–135.5° C. (hygroscopic).

Step B: Preparation of 1-(3-amino-6-methylpyrazinoyl)-3-(2 - hydroxyethyl)guanidine hydrochloride.—By replacing the 1,1-dimethylguanidine sulfate employed in Example 22 by an equimolecular quantity of (2-hydroxyethyl)guanidine sulfate and following substantially the same procedure described in Example 22 there is obtained 1-(3-amino-6-methylpyrazinoyl)-3-(2-hydroxyethyl)guanidine hydrochloride.

*Example 26.—1-(3-amino-6-methylpyrazinoyl)-3-phenylguanidinium methanesulfonate*

A mixture of methyl 3-amino-6-methylpyrazinoate (0.03 mole), phenylguanidine (0.05 mole) and isopropyl alcohol (3 ml.) is heated on the steam bath for 6 hours. Water (50 ml.) is added and the solid material is collected. The solids are treated with a warm solution of 5 ml. of methanesulfonic acid in 300 ml. of water. A small amount of insoluble material is filtered off. The filtrate is cooled and treated with 10 ml. of methanesulfonic acid to cause the methanesulfonic acid salt of the product to precipitate to give 1-(3-amino-6-methylpyrazinoyl)-3-phenylguanidinium methanesulfonate.

*Example 27.—1-(3-amino-6-methylpyrazinoyl)-3-benzylguanidine*

Step A: Preparation of benzylguanidine hydrochloride.—A mixture of benzylamine (80.3 g., 0.75 mole) and 2-methyl-2-pseudothiuronium sulfate (69.5 g., 0.25 mole) in water (200 ml.) is allowed to stand at room temperature for 18 hours. Methyl mercaptan is evolved and benzylguanidine sulfate separates as a crystalline precipitate. The salt is collected and dried, yielding 78 g. (0.196 mole) of product, M.P. 203–207° C. The salt is dissolved in 200 ml. of boiling water and a saturated aqueous solution containing barium chloride dihydrate (48.8 g., 0.2 mole) is added. The precipitate of barium sulfate is filtered off. The filtrate is evaporated to dryness in vacuo, and the residue, which crystallizes, is recrystallized from aqueous ethanol to give 51.5 g. (55% of theoretical, based on the amount of 2-methyl-2-pseudothiuronium sulfate used) of benzylguanidine hydrochloride, M.P. 175–178° C.

Step B: Preparation of 1 - (3-amino-6-methylpyrazinoyl)-3-benzylguanidine.—Benzylguanidine hydrochloride (9.3 g., 0.05 mole) is added to a solution of sodium (1.0 g., 0.043 g. atom) in 30 ml. isopropyl alcohol. The mixture is concentrated to one-half the original volume by vacuum distillation. Methyl 3-amino-6-methylpyrazinoate (0.01 mole) is added, and the reaction mixture is heated on a steam bath. Approximately 150 ml. of cold water is added whereby 1 - (3 - amino - 6-methylpyrazinoyl)-3-benzylguanidine separates.

The novel compounds of this invention can be compounded in the usual oral or parenteral dosage forms for use in therapy in the treatment of conditions resulting from an abnormal electrolyte excretion pattern of an animal organism. It will be appreciated that the dosage of each individual compound will vary over a wide range depending upon the relative potency of the selected compound and also depending upon the age and weight of the particular patient to be treated and upon the particular ailment to be treated. For these reasons, tablets, pills, capsules and the like containing, for example, from 5 to 500 mg. or more or less active ingredient can be made available for the symptomatic adjustment of the dosage to the individual patient. As each of the compounds of this invention can be incorporated in a dosage form similar to those described in the following examples, or other usual dosage forms suitable for oral or parenteral administration, which can be prepared by well-known methods, only one example is included herein to illustrate the preparation of representative dosage forms.

*Example 28.—Dry filled capsule containing 50 mg. of active ingredient*

| | Per capsule, mg. |
|---|---|
| (3 - amino - 6 - dimethylaminopyrazinoyl) - guanidine·HCl | 50 |
| Lactose | 273 |
| Magnesium stearate | 2 |
| Mixed powders | 325 |

Mix the (3 - amino-6-dimethylaminopyrazinoyl)guanidine hydrochloride, from Example 15, lactose, and magnesium stearate and reduce to a No. 60 mesh powder. Encapsulate, filling 325 mg. in each No. 2 capsule.

The above and other formulations that would be readily apparent to a pharmacist can be employed to prepare compressed tablets or capsules of the other novel compounds of this invention hereinbefore described.

It is also contemplated to combine compounds of this invention in unit dosage form with other known diuretic agents, such as, hydrochlorothiazide, 4'-methyl-6-chlorospiro - [2H - 1,2,4 - benzothiadiazide - 3(4H)-1'-cyclohexane] - 7-sulfonamide-1,1-dioxide, trichloromethiazide, cyclopenthiazide, acetazolamide, dichlorphenamide, chlorthalidone, chlormerodrin, chlorazinil or spironolactone and the like. An example of such a combination is presented below:

*Example 29.—Combination dosage form in dry filled capsule*

| | Per capsule, mg. |
|---|---|
| (3 - amino - 6 - methylpyrazinoyl)guanidine hydrochloride (from Example 2) | 50 |
| Hydrochlorothiazide | 50 |
| Magnesium stearate | 2 |
| Lactose | 223 |
| Mixed powders | 325 |

Mix all of the above ingredients, reduce to a No. 60 mesh powder and encapsulate, filling 325 mg. in each No. 2 capsule.

It is further contemplated to combine compounds of this invention with hypotensive agents, or steroids or other desired therapeutic agents in suitable dosage form.

While the above examples describe the preparation of certain compounds which are illustrative of the novel compounds of this invention, and certain specific dosage forms suitable for administering the novel compounds, it is to be understood that the invention is not to be limited to the specific compounds described in the examples or by the specific reaction conditions described for the preparation of these compounds or by the specific ingredients included in the pharmaceutical preparations, but is to be understood to embrace variations and modifications thereof which fall within the scope of the appended claims.

What is claimed is:

1. A (3 - amino - 6 - substituted-pyrazinoyl)guanidine selected from the group consisting of a product having the general structural formula

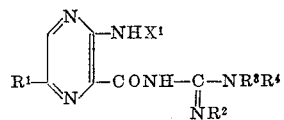

and pharmaceutically acceptable salts thereof wherein
$R^1$ is selected from the group consisting of lower alkyl, lower alicyclic, phenyl, halo-phenyl, phenyl-lower alkyl, lower alkoxy, lower alkylthio, lower alkyl-sulfonyl, phenyl-lower alkylthio, phenyl-lower alkylsulfonyl, amino, lower alkoxyamino, lower alkylamino, lower dialkylamino,

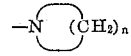

wherein $n$ is a numeral from 4 to 7, (phenyl-lower alkyl)amino, and anilino;
$R^2$ is selected from the group consisting of hydrogen and lower alkyl;
$R^3$ is selected from the group consisting of hydrogen, lower alkyl, hydroxy-lower alkyl, phenyl, phenyl-lower alkyl;
$R^4$ is selected from the group consisting of hydrogen and lower alkyl;
$R^2$ and $R^3$ when each is a lower alkyl, they can be joined together to form, with the nitrogen atoms to which they are attached, an imidazolinyl radical; and
$R^3$ and $R^4$ when each is a lower alkyl, they can be joined together to form, with the nitrogen atom to which they are attached, one of the cyclic structures 1-pyrrolidinyl, piperidino, 1-piperazinyl, 4-lower alkyl-1-piperazinyl and morpholino;
$X^1$ is selected from the group consisting of hydrogen and lower alkanoyl.

2. A product as claimed in claim 1, wherein $R^1$ is lower alkyl, and each of the variable radicals $X^1$, $R^2$, $R^3$ and $R^4$ is hydrogen.

3. A product as claimed in claim 2, wherein $R^1$ is methyl.

4. A product as claimed in claim 1, wherein each of the variable radicals $R^1$, $R^3$ and $R^4$ is a lower alkyl and each of the variable radicals $X^1$ and $R^2$ is hydrogen.

5. A product as claimed in claim 4, wherein each of the variable radicals $R^1$, $R^3$ and $R^4$ is methyl.

6. A product as claimed in claim 1, wherein each of the variable radicals $R^1$, $R^2$ and $R^3$ is lower alkyl, and each of the variable radicals $X^1$ and $R^4$ is hydrogen.

7. A product as claimed in claim 6, wherein each of the variable radicals R1, R2 and R3 is methyl.

8. A product as claimed in claim 1, wherein $R^1$ is lower alkylthio, and each of the variable radicals $X^1$, $R^2$, $R^3$ and $R^4$ is hydrogen.

9. A product as claimed in claim 8, wherein R1 is methylthio.

10. A product as claimed in claim 1, wherein R1 is benzylthio and each of the variable radicals $X^1$, $R^2$, $R^3$ and $R^4$ is hydrogen.

11. A product as claimed in claim 1, wherein $R^1$ is methylamino and each of the variable radicals $X^1$, $R^2$, $R^3$ and $R^4$ is hydrogen.

12. A product as claimed in claim 1, wherein $R^1$ is amino and each of the variable radicals $X^1$, $R^2$, $R^3$ and $R^4$ is hydrogen.

13. A product as claimed in claim 1, wherein R1 is lower alkyl; R3 is hydroxy-lower alkyl and each of the variable radicals $X^1$, $R^2$ and $R^4$ is hydrogen.

14. A product as claimed in claim 1, wherein $R^1$ is methyl and $R^3$ is 2-hydroxyethyl.

References Cited

UNITED STATES PATENTS 3,313,813  4/1967  Cragoe ............ 260—250

NICHOLAS S. RIZZO, *Primary Examiner.*